Patented Sept. 8, 1925.

1,552,793

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER FILM AND COMPOSITION FOR MAKING THE SAME.

No Drawing. Application filed February 24, 1923. Serial No. 621,080.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Films and Compositions for Making the Same, of which the following is a full, clear, and exact specification.

This invention relates to cellulose ether films and compositions for making the same. One object of the invention is to provide films in which the flexibility is maintained even under severe conditions, such as prolonged heating. Another object of the invention is to provide a flowable film-forming composition which will be stable and will produce films which will likewise be stable and maintain their flexibility. Other objects will hereinafter appear.

In U. S. Patent No. 1,188,376, Lilienfeld, June 20, 1916, there are disclosed a series of alkyl ethers of cellulose. Certain of these are practically insoluble in water, and the present invention relates primarily to ethers having that property, although it is not restricted to them. When such ethers are made into films for different purposes, such as photographic supports or protective coatings, it is desirable, under circumstances which are often met with in practice, that they withstand prolonged heating without becoming brittle. In testing such films to determine whether they will withstand the conditions of practice, severe tests are customarily made by heating them for several weeks at a temperature of 65° C. It is desirable that the films remain flexible even after twelve weeks of continuous heating at the above temperature.

I have discovered that films which maintain their flexibility under the above described conditions may be prepared by incorporating resorcinol therein. Moreover, the required proportion of this stabilizer is comparatively small, thereby lessening the expense of using it. It is incorporated with the cellulose ether by the aid of a common solvent, the resulting solution or dope being flowed or deposited and the films formed by evaporation of the volatile ingredients in the way understood by those skilled in the art. Being of high boiling point and consequent low volatility, resorcinol remains in the final film in a useful proportion.

For example, I may dissolve 20 parts by weight of cellulose ether, say water-insoluble ethyl cellulose, and 2 parts of resorcinol in 140 parts of a volatile solvent mixture, say methyl acetate and methyl alcohol. The ratio of methyl acetate to methyl alcohol may, of course, vary, 126 parts of the former to 14 parts of the latter being useful. The percentage of cellulose ether can, of course, be varied also, as well as the quantity of stabilizer. Where thin films or coatings are to be made by applying the composition as a lacquer or varnish, the amount of volatile solvent will be increased until the dope reaches the required thinness, as will be understood by those skilled in this art. With the proportions given in the example a dope is produced which may be used in the preparation of films for photographic purposes in the apparatus and by the methods customarily eployed. The product is tough, flexible and transparent.

Films produced from the hereinabove described compositions contain sufficient stabilizer, such as resorcinol, in combination with the colloidized cellulose ether to maintain their flexibility, even when they are heated for twelve weeks at 65° C. In practical use, where they are unlikely to meet any severer conditions, they maintain the necessary flexibility in a reliable way.

Resorcinol does not have to be employed alone, but other substances may be added to the dope which impart additional properties to it, such, for instance, as triphenyl or tricresyl phosphate, monochlornaphthalene, camphor, etc. The ingredients are of the ordinary commercial type sufficiently purified for the process of film manufacture so as to give dopes yielding films having the proper relative freedom from color.

Having thus described my invention, what I claim as new and desire to secure by Letters Patent is:

1. A composition of matter comprising cellulose ether and resorcinol, the ingredients being homogeneously mixed in unprecipitated from.

2. A composition of matter comprising cellulose ether and resorcinol dissolved in a volatile common solvent.

3. As an article of manufacture, a film comprising cellulose ether and a stabilizer of resorcinol.

4. As an article of manufacture, a transparent flexible film for use as a photographic support comprising water-insoluble ethyl cellulose and resorcinol.

Signed at Rochester, New York this 19th day of February, 1923.

STEWART J. CARROLL.